United States Patent Office 3,496,113
Patented Feb. 17, 1970

3,496,113
REAGENT AND METHOD FOR SODIUM ANALYSIS IN SOLUTIONS
Jerome A. Platte, Pittsburgh, and Victor M. Marcy, Carnegie, Pa., assignors, by mesne assignments, to Calgon Corporation, a corporation of Delaware
No Drawing. Filed Oct. 17, 1966, Ser. No. 586,932
Int. Cl. C09k 3/00; G01n 33/00
U.S. Cl. 252—408      10 Claims

ABSTRACT OF THE DISCLOSURE

Novel compositions and their use in improving the sodium electrode technique for analyzing aqueous solutions for sodium ion content are disclosed.

---

This invention relates to the art of chemical analysis. More particularly, it is an improvement in techniques for the analysis of very small quantities of sodium in solution.

The glass electrode method of analysis for sodium is now well known. See for example, Eisenman et al. U.S. Patent 2,829,090 entitled "Glass Electrode for Measuring Sodium Ion" and "Glass Electrodes for the Direct Measurement of Sodium Ion Activity in Aqueous Solutions," by J. E. Leonard, Reprint R–6148, Beckman Instruments, Inc., Fullerton, Calif. The glass electrode method has been found very useful for concentrations of sodium of extremely small values, i.e. as little as one part per billion. The method is based upon the relationship of the sodium ion concentration to the number of millivolts generated between electrodes of calomel and certain aluminum silicate glasses. The latter electrode is sometimes known as a "sodium electrode," the name being derived from its major use rather than its composition.

Sodium ion analysis using a glass electrode is finding increasing use for such important purposes as monitoring sodium content in condensed steam, where the concentration may be as low as one part per billion. However, at such low concentrations, there are many difficult problems of contamination and interference from various impurities and other factors. Perhaps the most bothersome is the interference caused by the precipitation or settling of heavy metal oxides and salts on the glass electrode. This process is known as "fouling" of the electrode, and can be caused by iron in the parts per billion range. Since iron is likely to be present in virtually any industrial water in the parts per billion range, glass electrode fouling is a very common problem. The immediate result of glass electrode fouling is a reduction in response as a function of the area, thickness, and chemical nature of the iron deposit, producing errors which are unpredictable and for which the only compensation is to clean the electrode. In some circumstances, daily cleaning of the electrode is required.

Part of the established procedure in analyzing with a sodium electrode is to elevate the pH of the sample to at least 9, preferably 10, to minimize the influence of hydrogen ion concentration on the result. The additive used to raise the pH is loosely referred to as an alkaline buffer, and commonly is ammonia or ammonium hydroxide. Other suitable buffers are morpholine and cyclohexylamine. Any alkaline material may be used which is substantially free of sodium and which will not otherwise react with the sample constituents. We prefer to use morpholine.

In our novel procedure, we employ a chelating agent for heavy metals. For most purposes, a chelating agent of known effectiveness generally for heavy metal ions will be useful in any application. Such a complexing agent is ethylene diamine tetraacetic acid, since it will complex the most common heavy metals, such as iron, copper, zinc, and aluminum. Other chelating agents of general utility are 1,2 diaminocyclohexane-N,N,N′, N′tetraacetic acid, diethylenetriaminepentaacetic acid, ethylene glycol-bis-(β - aminoethylether) - N,N′tetraacetic acid, ethyletherdiaminetetraacetic acid, 1-methylethylene-diamine tetraacetic acid (or 1,2 propylene diamine tetraacetic acid, nitrilotriacetic acid, pentaethylenehexamine, tetraethylene pentamine, triethylenetetramine, potassium cyanide, potassium citrate, etc. Where there is a known specific contaminating heavy metal, a chelating agent may be chosen which preferentially complexes the contaminating agent. Such specific chelating agents are known in the art. However, where the contaminating heavy metals are somewhat variable, one or more of the above or a mixture with other general utility chelating agents is most successfully used.

We find that triethanolamine may be used successfully in many water samples both to complex the heavy metal ions such as iron, aluminum and copper, and to raise the pH.

Our preferred compositions are combinations of triethanolamine and morpholine. A weight ratio, usually about 2.5 to 1, of about 2.0 to 1 to about 3.0 to 1, of morpholine to triethanolamine, is preferred. However, it is possible for the triethanolamine to replace the morpholine entirely. There should be enough triethanolamine to complex the iron or other heavy metal present and to elevate the pH, in the absence of other pH adjustment, to at least about 9.5.

We may use up to about 5000 parts per million of our reagent compositions in the sample. Lower concentrations to near zero are also effective—there appears to be no practicaly lower limit, in the sense that a very small concentration, (e.g. 1 p.p.m.), is effective to a small degree.

A preferred form of our reagent may be made according to the following recipe: To 250 ml. of morpholine are added 100 ml. of triethanolamine, and one gram of EDTA in the acid form. Sufficient deionized water is then added to make a final preparation of 500 ml. Prior to use, this preparation may be further diluted to one gallon. One half milliliter (0.5 ml.) of the one-gallon solution is suitable for the determination of sodium in a typical 50 ml. sample of deionized water.

The following examples illustrate the effectiveness of our invention.

Example I

A conventional glass electrode unit was set up to continuously monitor the sodium content of an ordinary distilled water produced by a laboratory still. Within several hours, erratic results were observed due to fouling of the electrode. When a clean electrode was installed to replace the fouled one, it too became fouled within a short time. Upon again replacing the electrode, triethanolamine was introduced to the reagent along with the morpholine buffer, and the unit performed satisfactorily for 5 days with no indication of fouling. The use of triethanolamine was discontinued, and gain fouling occurred within a matter of hours. This time the triethanolamine treatment was resumed without first cleaning or replacing the fouled electrode. The glass electrode was slowly cleaned and the instrument functioned accurately and normally within a few hours.

Example II

An industrial steam condensate was monitored for sodium but difficulties arose due to the deposition of, primarily, zinc on the glass electrode. In this case, the addition of about 3 p.p.m. ethylene diamine tetraacetic acid was found to clear up the zinc problem, while (300 p.p.m.) triethanolamine maintained the iron in a harmless state.

We have observed that the addition of a detergent to our morpholine-triethanolamine reagent mixture will control the otherwise inhibitry effect of fatty amine corrosion inhibitors commonly used in condensate treatment, such as octadecylamine.

Any organic anionic detergent may be used, so long as its sodium content is known to be insignificant and any heavy metal contaminants in it may be controlled. We prefer to use an anionic detergent where filming amine or other organic contaminants are present. Preferred ranges of concentration are 10–100 p.p.m. We prefer to use a versatile sodium free, anionic detergent intermediate such as dodecylbenzene sulfonic acid.

Example III

At an installation where the boiler condensate being monitored was a mixture of condensate return from more than one boiler, it was found that maintenance of 660 p.p.m. of triethanolamine and 3 p.p.m. of EDTA in the samples resulted in excellent control of iron and zinc contaminants and maintained the pH in a desirable range. However, erratic results were still observed and it was deduced that they were due to the introduction of filming amine carried over from one of the treated boilers. After a determination that the addition of 25–30 p.p.m. of "Ucane Alkylated 12 Sulfonic Acid," a sulfonated dodecylbenzene, would increase the sodium content of the sample by about one eighth of a part per billion, the detergent was added and satisfactory results were obtained at 25 p.p.m. in one instance and superior results were obtained at 100 p.p.m. All concentrations used in excess of 25 p.p.m. maintained the sodium electrode free of organic contaminants throughout the trial.

We claim:

1. Composition useful in the analysis of sodium content in solutions by a glass electrode method, consisting essentially of (a) a major proportion of morpholine, (b) a minor proportion of triethanolamine, and (c) a minor proportion of ethylene diamine tetraacetic acid.

2. Composition useful in the analysis of sodium content in solutions by a glass electrode method, consisting essentially of by weight, (a) about one part of a composition substantially free of sodium and capable of complexing iron in aqueous solution selected from the group consisting of ethylene diamine tetraacetic acid, 1,2-diaminocyclohexane - N,N,N',N' - tetraacetic acid, diethylenetriaminepentaacetic acid, ethylene glycol-bis-(β-aminoethyl ether)-N,N'-tetraacetic acid, ethyletherdiaminetetraacetic acid, 1-methylene-diamine tetraacetic acid, 1,2 - propylene diamine tetraacetic acid, nitrilotriacetic acid, pentaethylenehexamine, tetraethylene pentamine, triethylenetetramine, potassium cyanide, potassium citrate, and triethanolamine and (b) about 2 to about 3 parts sodium-free alkaline buffer selected from the group consisting of ammonia, ammonium hydroxide, morpholine, and cyclohexylamine.

3. Method of preparing a sample for determination of sodium content by a glass electrode technique comprising treating said sample with an amount of the composition of claim 1 sufficient to adjust the pH of the sample to at least 9.0, said amount being up to about 5000 parts per million based on the sample.

4. Method of preparing an aqueous sample for determination of sodium content by a glass electrode technique comprising treating said sample with sufficient chelating agent to complex the heavy metal ions therein, said chelating agent selected from the group consisting of ethylene diamine tetraacetic acid, 1,2 - diaminocyclohexane - N,N, N',N'-tetraacetic acid, diethylenetriaminepentaacetic acid, ethylene glycol-bis-((β-aminoethyl ether) - N,N'-tetraacetic acid, ethyletherdiaminetetraacetic acid, 1 - methylethylene-diamine tetraacetic acid, 1,2 - propylene diamine tetraacetic acid, nitrilotriacetic acid, pentaethylenehexamine, tetraethylene pentamine, triethylenetetramine, potassium cyanide, potassium citrate, and triethanolamine, and adjusting the pH to at least 9.0 with a sodium-free alkaline buffer selected from the group consisting of ammonia, ammonium hydroxide, morpholine, and cyclohexylamine.

5. Method of preparing an aueous sample for determination of sodium content by a glass electrode technique comprising treating said sample with sufficient triethanolamine to complex the heavy metal ions therein, and to elevate the pH to at least about 9.5.

6. Method of preparing an aqueous sample for sodium determination by a glass electrode technique comprising treating said sample with up to about 5000 p.p.m. of a composition consisting essentially of about two to about three parts by weight morpholine to one part triethanolamine.

7. Composition of claim 1 including a minor proportion of a sodium-free anionic detergent.

8. Composition of claim 2 including a minor proportion of a sodium-free anionic detergent.

9. Method of preparing a sample for determination of sodium content by a glass electrode technique comprising treating said sample with up to about 5000 parts per million of the composition of claim 8.

10. Method of claim 6 in which up to about 100 p.p.m. of a sodium-free anionic detergent is also added.

References Cited

UNITED STATES PATENTS 2,829,090   4/1958   Eisenman et al. _____ 204—1.1
3,076,696   2/1963   Reeve _____ 252—408 XR MAYER WEINBLATT, Primary Examiner U.S. Cl. X.R.

23—230; 204—1.1

UNITED STATES PATENT OFFICE
CERTIFICATE OF CORRECTION

Patent No. 3,496,113            February 17, 1970

Jerome A. Platte et al.

It is certified that error appears in the above identified patent and that said Letters Patent are hereby corrected as shown below:

Column 3, line 44, "1-methylene-" should read -- 1-methylethylene- --.

Signed and sealed this 23rd day of February 1971.

(SEAL)
Attest:

Edward M. Fletcher, Jr.            WILLIAM E. SCHUYLER, JR.
Attesting Officer            Commissioner of Patents